United States Patent [19]
Rink et al.

[11] Patent Number: 5,649,720
[45] Date of Patent: Jul. 22, 1997

[54] INFLATORS WHICH STORE PREMIXED FLUID FUEL AND OXIDIZER IN A POROUS MATRIX

[75] Inventors: Karl K. Rink, Liberty; David J. Green, Brigham; Guy R. Letendre, Ogden, all of Utah

[73] Assignee: Morton International, Inc., Chicago, Ill.

[21] Appl. No.: 565,331

[22] Filed: Nov. 30, 1995

[51] Int. Cl.⁶ .................................................. B60R 21/26
[52] U.S. Cl. ........................ 280/737; 280/741; 222/3; 102/531
[58] Field of Search ...................... 280/736, 737, 280/741, 740, 742; 222/3, 5; 137/68.13, 68.19, 68.23, 68.3; 102/530, 531

[56] References Cited

U.S. PATENT DOCUMENTS

| | | |
|---|---|---|
| 3,822,895 | 7/1974 | Ochiai .................................. 280/737 |
| 5,263,740 | 11/1993 | Frey et al. ............................ 280/737 |
| 5,344,186 | 9/1994 | Bergerson et al. ..................... 222/5 |
| 5,348,344 | 9/1994 | Blumenthal et al. .................. 280/737 |
| 5,433,476 | 7/1995 | Materna et al. ...................... 280/736 |
| 5,441,302 | 8/1995 | Johnson et al. ...................... 280/736 |
| 5,470,104 | 11/1995 | Smith et al. ......................... 280/737 |
| 5,487,561 | 1/1996 | Mandzy et al. ...................... 280/736 |

*Primary Examiner*—Brian L. Johnson
*Assistant Examiner*—Peter C. English
*Attorney, Agent, or Firm*—Henry W. Tarring, II; Gerald K. White

[57] ABSTRACT

The storage of combustible mixed fluid fuel and oxidizer in a porous matrix provides for enhanced control of fluid fueled inflators such as are used in automotive passive restraint airbag systems. By storing such in mixtures in a porous matrix having pores smaller than the quenching distance of the stored mixture the flammability of the mixture is suppressed. Storage of the mixture in a porous matrix having larger pores provides a mechanism for controlling the rate of release of the mixture, as well as providing a heat sink which helps moderate the temperature of the mixture during the filling operation, during long term storage and during the combustion process. Several inflator embodiments, with particularly advantageous structures for storing and releasing the mixture, are disclosed.

61 Claims, 5 Drawing Sheets

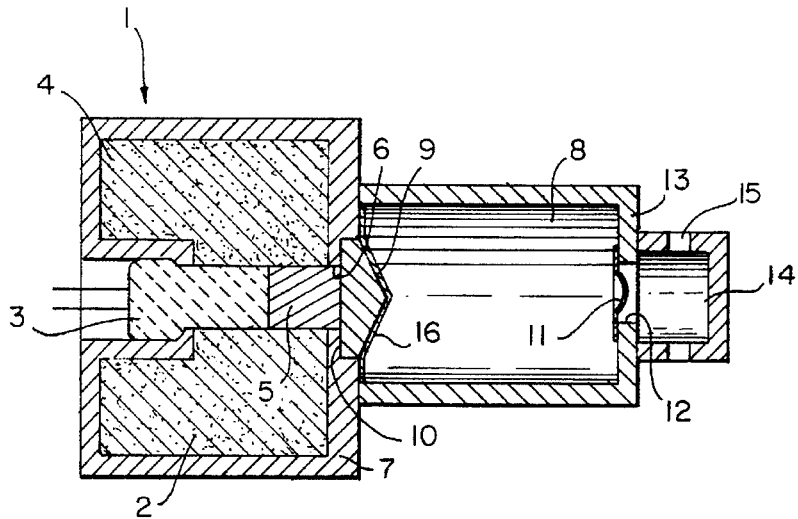
FIG. 1
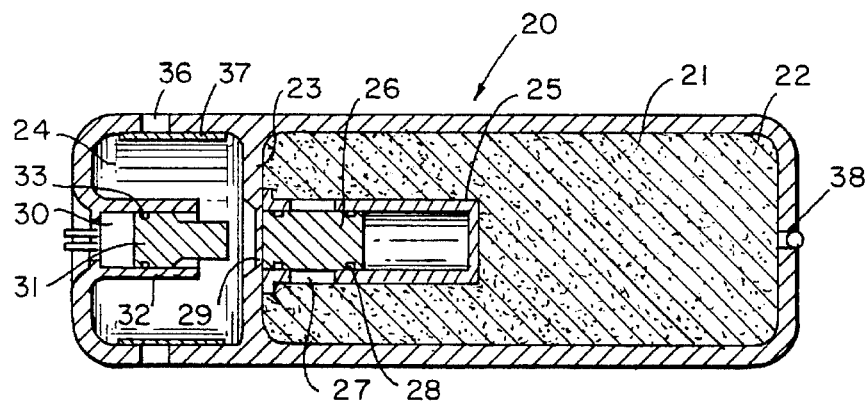
FIG. 2A
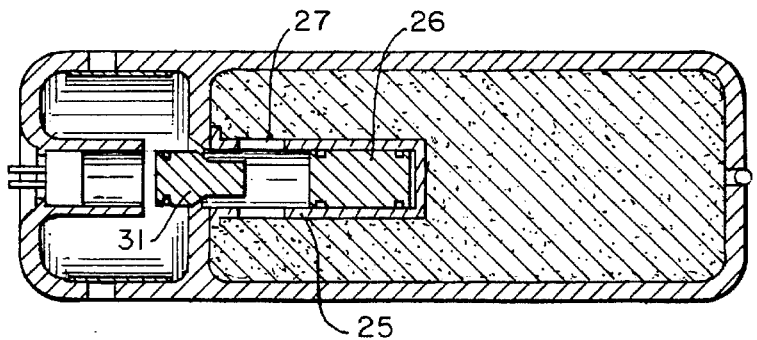
FIG. 2B
FIG. 2C
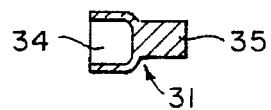

INFLATORS WHICH STORE PREMIXED FLUID FUEL AND OXIDIZER IN A POROUS MATRIX

BACKGROUND OF THE INVENTION

Inflatable restraint systems, commonly referred to as airbag systems, which deploy automatically in the event of a collision to shield and cushion the occupants of a vehicle from the hard surfaces within the passenger compartment, have become very popular in modern motor vehicles. Many types of inflator devices for inflating the airbag cushion in such systems have been disclosed. Such inflators should be capable of releasing a sufficient quantity of a non-toxic gas to inflate the airbag cushion in a very short period of time. Additionally, the inflator needs to provide a high degree of reliability over the extended temperature range in which modern vehicles are expected to operate, and over the extended lifetime of the vehicle.

One of the disclosed inflator designs relies on a stored compressed gas which is released to inflate the airbag. Another design relies on the ignition of a solid gas generating material to produce a sufficient quantity of gas to inflate the airbag. A third type of inflator relies on the combination of an inert stored compressed gas and the combustion of a solid gas generating material. While these designs are functional to provide the gas needed to inflate an airbag, they each have disadvantages. The designs which rely solely on compressed gas must provide a relatively strong gas storage container, the relatively thick walls of which increase the weight and bulk of the airbag assembly, a concern to those vehicle manufacturers who seek to minimize the weight of such vehicles. The designs which rely on the ignition of a solid gas generant material usually result in a generated gas which contains solid particulate material at a sufficiently elevated temperature that it requires further conditioning, such as filtering and cooling, before it encounters the fabric cushion of the airbag assembly.

Some of the more recent inflator designs rely on fluid fuels and oxidants which, in addition to lower manufacturing costs, offer advantages such as, inter alia, cleaner generated gases which contain little or no solid particulate matter, and which can be provided at relatively low temperatures and with relatively low concentrations of incomplete products of combustion. Some of these designs are more fully described in U.S. patent application Ser. No. 08/252,036, entitled FLUID FUELED AIR BAG INFLATOR, now U.S. Pat. No. 5,470,104, filed by Bradley W. Smith and Karl K. Rink and commonly assigned with this application. Application Ser. No. 08/252,036 is hereby incorporated by reference.

A need exists, however, to improve the design of the known fluid fueled inflators to provide structural characteristics which provide regulation of the gas storage, heating and release procedures whereby the proper design of the structure enables the inflation characteristics of the airbag to be tailored to meet specific requirements. Such designs must also provide for the flammable components to be held safely over the expected lifetime of the vehicle. The designs further need to reliably produce an inflation gas which does not contain significant amounts of relatively toxic incompletely combusted gases. Additionally, the designs must be capable of being rapidly and safely manufactured and filled with the flammable mixtures. Finally, to ensure proper operation, the ignition process must be reliable.

SUMMARY OF THE INVENTION

A primary object of the present invention is the provision of a fluid fueled inflator having a unique storage chamber for safely containing a combustible mixture of a fluid fuel and an oxidizer over an extended period of time.

A related object is the provision of a fluid fueled inflator having a unique storage chamber which minimizes the possibility of an undesired ignition of the combustible mixture occurring during the manufacturing and filling process.

Another object is the provision of a fluid fueled inflator wherein improved mixing of the fuel and the oxidizer assures relatively complete combustion of the fuel, and thereby avoids the production of relatively toxic incompletely combusted gases.

A further object is the provision of a fluid fueled inflator having structural characteristics which can be altered to affect the inflation characteristics of the airbag, thereby providing an enhanced degree of control of the airbag performance achieved through appropriate selection of structural design parameters. A particular application of this objective would involve the selection of structural parameters which control the internal pressures within the inflator to minimize the internal operating pressure. This, in turn, permits minimization of the inflator wall thickness, leading to the minimization of inflator weight.

The present invention involves a fluid fueled inflator wherein the fuel is premixed with an oxidizer, and the combustible mixture is stored in a porous matrix. The porous matrix influences the inflator's performance in several manners, each of which can be controlled by appropriate selection of the porous matrix parameters in each particular inflator model. The size of the pores and the particular geometry in the region where the stored gas exits the porous matrix influence the rate at which gases are discharged from the matrix. If the matrix is provided in a storage chamber which feeds a combustion chamber, the rate of discharge of the gas from the storage matrix affects the rate of combustion in the storage chamber and, thereby, the rate at which the airbag cushion inflates. If the matrix is provided in a storage chamber which also serves as the combustion chamber, in addition to affecting the rate of discharge of the combusted gases, the heat sink property of the porous matrix serves to moderate the combustion process by avoiding hot spots in the combustion chamber thereby minimizing the formation of nitrogen oxides. At the same time the heat sink property enables the matrix to act as a radiant heat source, assuring efficient heat transfer to the flammable mixture and the maintenance of a high reaction rate, thereby minimizing the production of products of incomplete combustion, such as carbon monoxide and unburned hydrocarbons. The heat sink property also cools the combustible mixture as it is charged to the storage chamber, removing some of the heat developed by compression of the mixture during the charging process. The heat sink property can be emphasized by providing a matrix wherein the pores are smaller than the quenching distance of the fuel/oxidant combustible mixture. Such a matrix provides a storage chamber wherein the otherwise flammable mixture cannot propagate a flame. In such a storage chamber, heat is removed through the heat sink property of the porous matrix faster than it is produced through combustion of the flammable mixture. Finally, by providing particular regions having different pore sizes within the same matrix, it is possible to provide storage chambers which have the properties attributable to each of the employed pore sizes.

In one form of the present invention, the internal volume of the storage chamber is filled with a porous matrix. Upon activation of the inflator, the storage chamber is opened, allowing the mixture to pass to an adjoining combustion chamber where it ignites producing sufficient gas to rapidly inflate the associated airbag. Additional oxidant and/or inert gas can be stored in the combustion chamber, in which case, upon activation, these additional gases mix with the ignited flammable mixture. If additional oxidant is initially present in the combustion chamber, it participates in the combustion of the fuel provided in the flammable mixture. If the additional gases initially present in the combustion chamber include inert gases, these are heated as a result of the combustion of the flammable mixture and subsequently expanded, thereby resulting in an enhanced volume of gas output from the inflator.

In a further form, the porous matrix containing the stored flammable mixture is provided directly within the combustion chamber. Upon activation, the flammable mixture is ignited causing the porous matrix to rapidly absorb heat to a point where it becomes a radiant heat source. Since the flammable mixture is dispersed throughout the matrix, the flow of heat to the matrix is relatively uniform, resulting in the elimination of hot spots. High, uniform reaction rates with minimal formation of products of incomplete combustion result. The matrix can also be designed to control the flow rate at which the combustion products are discharged from the combustion chamber and into an inert gas containing chamber. The gases produced in the combustion chamber can either be discharged from the inflator and routed to the apparatus to be inflated, or they can be directed to an auxiliary gas chamber containing a pressurized auxiliary gas. Typically, the auxiliary gas is an inert gas which is expanded by the heat input from the combustion product gases provided from the combustion chamber. At the same time, the combustion product gases are cooled, or tempered, by their admixture with the auxiliary gas to a temperature more compatible with the materials used to form the airbag cushion.

The pore size in the porous matrix can be controlled to (a) provide increased safety during the long term storage of the flammable gas mixture, (b) to control the flow rate of the flammable mixture as it is released from storage during the ignition phase and/or (c) to act as a radiant burner during the ignition phase. Increased safety is inherently provided by the use of the porous matrix. If a "hot spot" occurs due to a localized reaction or some other cause, heat produced thereby is lost to the porous matrix. When the heat lost to the matrix exceeds the rate of heat generation, the localized reaction will be effectively quenched, preventing further propagation of the reaction. The safety factor can be maximized by providing pores which are smaller than the quenching distance of the stored flammable mixture. Control over the flow rate of the flammable mixture as it releases from storage is achieved through the design of the size of the interface between the storage chamber and the succeeding combustion or inert gas chambers coupled with the size of the pores provided adjacent the interface. Control over ignition through the matrix functioning as a radiant burner is also achieved by control of the pore size adjacent the interface between the storage and combustion chambers or within the combined storage/combustion chamber.

Quenching distance is a recognized characteristic property, in flame propagation theory and practice, which defines a minimum distance or diameter (for a given geometry) under which propagation of a flame is not possible because the heat generated by the chemical combustion reaction is exceeded by the heat loss to the surroundings. Two good references are Principles of Combustion, by Kenneth K. Kuo, Wiley, New York, 1986 and Combustion Theory, by Forman A. Williams, Addison-Wesley, Redwood City, Calif., 1985. By storing the combustible mixture in a porous matrix wherein the size of the pores is maintained within the quenching distance, the flammability of the combustible mixture is thoroughly suppressed. When the combustible mixture passes from the matrix and the restraint placed on it by such matrix is released, as when it passes to the combustion chamber, under proper conditions it regains its capability to propagate combustion. The capability of the porous matrix to suppress the flame propagation of a stored flammable mixture is most effectively deployed adjacent the interface of such a stored mixture with other environments into which it could potentially escape. One advantage of the ability to suppress and regain combustion capability with a given mixture is the capability of controlling the location of combustion in specific regions or locations. The porous matrix provided within the storage chamber could have pore sizes adjacent its interface with the combustion chamber which are smaller than the quenching distance of the combustible mixture, while having pore sizes larger than its quenching distance at locations further removed from such interface. The larger pore size locations provide enhanced storage capacity over a porous matrix having all of its pore sizes less than the quenching distance. The particular quenching distance is dependent on the combustible mixture composition, its temperature and pressure. Generally, as the temperature and/or pressure increase, the quenching distance is reduced, and flame propagation becomes easier. The quenching distance for a given combustible mixture of known composition, pressure and temperature can be determined experimentally through a process of passing a propagating flame through a series of progressively narrower passages until it encounters a passage where its flame will not propagate. One method involves passing a combustible mixture of known composition, pressure and temperature through a relatively large tube to an ignition source. After a stable flame is established, the supply of fresh, unburned, mixture is abruptly terminated, resulting in the flame propagating upstream through the tube in a phenomena known as "flashback". The experiment is repeated with progressively smaller diameter tubes until the smallest tube which permits propagation of the flame is identified. The diameter of such tube is the "quenching diameter" for the combustible mixture under the specified conditions of composition, pressure and temperature. The flame cannot flashback in tubes having diameters smaller than the quenching diameter because excessive heat is lost to the tube walls. This experiment can be repeated with passages having different geometries resulting in slightly different quenching distances. Regardless of the exact nature of the passage, the concept of providing a limiting geometry below which propagation of a flame is not possible is valid and is the theory underlying one aspect of this invention.

The porous matrix can be fabricated from various ceramic, metal, plastic, refractory or composite materials. Preferred materials are sintered, reticulated or vitropore ceramics. The matrix can be shaped such that it fully occupies the otherwise unoccupied space in the storage chamber. However, as is more fully explained hereinafter, various aspects of the invention are effective even if voids or otherwise unoccupied space are provided in or adjacent the matrix. The material used to form the matrix can be inert during the gas generation reaction or, except when it is intended to function as a radiant burner, it can participate in the reaction, being consumed in the process.

When a separate combustion chamber is provided, the maze through which the components of the combustible mixture are required to pass as they are charged and subsequently discharged from the porous matrix serves to assure that the flammable mixture is well mixed when subjected to ignition. The complete mixing of the components minimizes the production of incompletely combusted products, such as relatively toxic carbon monoxide, which could occur were incompletely mixed carbonaceous fuel and oxidizer combusted.

The surface area of the porous matrix which, upon activation, becomes exposed to the opening between the storage chamber and a succeeding chamber, in conjunction with the pore size of the matrix and the storage pressure of the gases, controls the rate at which the gaseous mixture is released from the porous matrix. Accordingly, appropriate design of the surface area of the porous matrix in flow communication with the succeeding chamber through such opening, provides control over the inflator's rate of gas output. Various alternative designs of the interface between the storage chamber and the succeeding chamber are illustrated in the accompanying figures.

When a separate combustion chamber is provided, increased ignition control is established by permitting a limited degree of "flashback" into the porous matrix adjacent its interface with the combustion chamber. Such "flashback" is the propagation of the flame in the combustion chamber upstream (against the bulk flow of gas) and into the pores of the matrix. It causes the matrix to quickly absorb heat and act as a radiant energy source assuring ignition of the combustible mixture as it flows from the matrix to the combustion chamber.

In order for such flashback to occur, pore sizes larger than the quenching distance need to be provided adjacent the interface with the combustion chamber.

When the storage chamber also serves as the combustion chamber, the pore size of the porous structure needs to be larger than the quenching distance. However, a section of the porous matrix adjacent the outlet of the chamber can have pore sizes smaller than the quenching distance in order to assure that the combustion reaction is completely quenched in the combusted gases exiting the combustion chamber.

BRIEF DESCRIPTION OF THE DRAWINGS

FIG. 1 is a schematic view illustrating double chamber embodiments of the present invention.

FIGS. 2A and 2B illustrate a single chamber embodiment in its storage mode (FIG. 2A) and in its activated mode (FIG. 2B). FIG. 2C further illustrates the projectile used in the embodiment of FIGS. 2A and 2B.

DETAILED DESCRIPTION OF THE INVENTION

Figure 3:
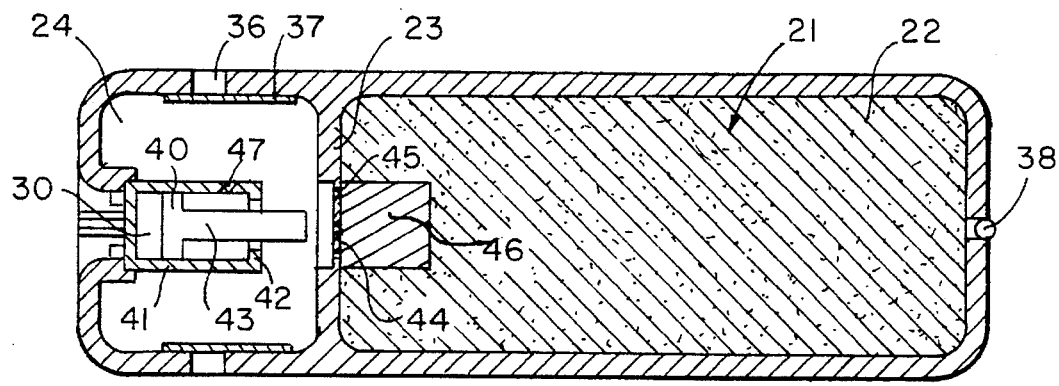
FIG. 3 illustrates a further single chamber embodiment of the present invention.

The schematically illustrated inflator of FIG. 1, depicts the general functions of various components of double chamber embodiments of inflators according to the present invention. The conceptual inflator 1 includes a storage chamber 2 with an initiator 3, often referred to as a squib, mounted through one wall thereof. The storage chamber 2 contains a porous body 4 which essentially occupies all of the free space remaining in the interior of the chamber after all of the components are assembled. A small pyrotechnic body 5 located directly in front of the initiator 3 extends into an opening 6 provided in the wall 7 which separates the storage chamber 2 from the combustion chamber 8. The face of the pyrotechnic body 5 opposite the initiator 3 is directly behind a solid metal plug 9, which is seated on shoulder 10 in opening 6. The solid metal plug 9 can include surface grooves extending radially along its conical face (not shown) to assure that, once deployed, it does not effectively block and seal the opening 12 in wall 13. The opening 6 can be hermetically sealed by providing a thin metal foil 16 overlying the metal plug 9 and sealed to the wall 7 about the perimeter of the opening. A rupture disc 11 covers an opening 12 in the wall 13 of the combustion chamber opposite wall 7. The opening 12 communicates with diffuser 14, which has openings 15 to the exterior of the inflator for permitting the product gases to exit the inflator. The openings 15 should be located such that the reactive forces created by the escaping gas cancel each other out producing no significant net thrust forces acting on the inflator during gas production. The porous matrix 4 in storage chamber 2 is filled with a combustible mixture comprising a fluid fuel and an oxidizer. The porous matrix is fabricated from a porous material wherein the maximum pore diameter is less than the quenching distance of the stored flammable mixture at the maximum temperature and maximum pressure it is expected to encounter during the effective life of the inflator. The combustion chamber 8 can be filled with an auxiliary gas comprising oxidants and/or inert gases. If oxidants are provided in the auxiliary gas, they mix and combust with the combustible mixture during activation of the inflator. If inert gases are provided in the auxiliary gas, they mix with the combusted gas ignition products of the combustible mixture whereby they are heated and subsequently expand, creating an enhanced volume of produced gas, while also serving to quench the flame through temperature reduction and dilution.

Upon receipt of an electrical signal from a sudden deceleration, or other, crash sensor (not shown), initiator 3, ignites causing ignition of the pyrotechnic body 5. The ignition products, primarily gases, released from the ignition of initiator 3 and pyrotechnic body 5 produce a pressure rise causing the solid metal plug 9 to be dislocated from shoulder 10 in wall 7 and be propelled across chamber 8 to strike and burst rupture disc 11. The dislodging of metal plug 9 and consumption of pyrotechnic body 5 permits the combustible mixture of fluid fuel and oxidizer to pass from the porous structure 4 and into the combustion chamber 8. During this passage the combustible mixture is ignited as it comes in contact with the ignition products produced by the initiator and the pyrotechnic body. The combined combustion products then mix with and heat the auxiliary gases stored in the combustion chamber 8. The mixed gases then burst and pass through the rupturable seal, i.e. rupture disc 11, then expand and exit the inflator through outlet openings 15 in the diffuser 14. They can then be routed to the interior of the airbag cushion.

The combustible mixture stored in the porous matrix consists of a fluid fuel and an oxidizing agent. It may also optionally include other agents, such as water or inert gases. Helium is an inert gas which is typically provided for its ready detectibility in leak detection testing. The fluid fuels which may be provided in the combustible mixture include gases, vapors and liquids which when mixed with an appropriate amount of oxidant form a combustible mixture. These fluid fuels include hydrogen; hydrocarbons, such as olefins and paraffins; derivatives of hydrocarbons, such as oxygenated hydrocarbons, including alcohols, ethers and esters; and mixtures thereof. The oxidizing agent typically is oxygen, either in its pure form or in mixture with other gaseous ingredients, as in air, or with other gases such as noble gases or carbon dioxide. Nitrous oxide, in the liquid or vapor phase (or a combination of both) is also a useful oxidizing agent. Since the combustible mixture must be capable of rapid movement through the porous matrix, combustible mixtures which are gaseous at the activation temperature and pressure conditions are preferred. Such gaseous mixtures may contain suspended denser phase materials, provided such mixtures are compatible with the proper functioning of the combustible mixture in the porous matrix. The gaseous mixtures are stored at pressures in the range of 500 to 4500 psi, preferably in the range of 1000 to 3000 psi.

The auxiliary gas provided in the combustion chamber 8 typically comprises an inert gas, an oxidizing gas, or a mixture thereof. The inert gases which could be used include the noble gases, such as argon, and other gases which are substantially inert during both of the storage and the combustion phases, such as helium, nitrogen, and carbon dioxide. The oxidizing gas could be any of the oxygen-containing gases described for use in the flammable mixture. The auxiliary gas is stored at pressures in the range of 2000 to 4500 psi, preferably in the range of 3000 to 4000 psi.

The total amount of oxidizing agent provided in the inflator should be at least the stoichiometric amount to fully burn the total amount of fuel provided, i.e. to fully combust all of the fuel provided to carbon dioxide and water. Preferably, substantially more than the stoichiometric amount of oxidizing agent is provided to assure that excess oxygen exists throughout the gas production process.

The embodiment illustrated in FIGS. 2A through 2C uses a projectile to move a piston away from a blocking position in front of openings in the storage chamber wall. In this embodiment, inflator 20 includes storage chamber 21 containing a porous structure 22 and filled with a combustible mixture of a fluid fuel and an oxidizer. Wall 23 separates the storage chamber 21 from the combustion chamber 24. Piston retainer 25 contains a piston 26 and extends from wall 23 into the porous structure 22. The piston retainer 25 includes openings 27 which, when in the static storage mode, are straddled by piston rings 28 provided at each end of the piston 26. The piston retainer is aligned with a hermetic barrier 29 provided in wall 23. The hermetic barrier assures that the combustible mixture does not escape the storage chamber over the potentially extended effective lifetime of the inflator (usually fifteen years or longer) even in the event some leakage occurs around the piston rings 28. On the side of the combustion chamber 24 opposite the hermetic barrier 29, a pyrotechnic initiator 30 is provided directly behind projectile 31 in mounting structure 32. The mounting structure 32 is aligned to direct projectile 31 toward hermetic barrier 29. Projectile 31 is provided with a single piston ring 33 and, as seen in FIG. 2C, is fabricated with an internal cavity 34 at its end facing the initiator 30, and a solid end 35 facing the hermetic barrier 29. Outlet openings 36 are provided to vent the produced gases to their intended use, i.e. to inflate an airbag cushion. A filter 37, of, for instance, a wrapping of a metal screen, can be located directly inside the outlet openings. Fill port 38 is provided for adding the flammable mixture to the storage chamber.

A crash sensor (not shown) activates the inflator by transmitting an electrical signal to the initiator 30, causing it to ignite. The resulting heat and gaseous ignition products rapidly develop pressure behind the projectile 31 propelling it across the combustion chamber and into piston 26, rupturing the thin hermetic barrier 29 in the process. The relatively massive projectile 31 causes the piston 26 to be displaced along piston retainer 25 to the position shown in FIG. 2B. Displacement of the piston effectively uncovers openings 27 permitting the combustible mixture to flow from the porous matrix 22 to the combustion chamber 24. As the well-mixed gases flow through the piston retainer 25 and the combustion chamber 24 they ignite as they contact the radiant particles and heat produced by the initiator 30. Ignition of the combustible mixture results in the rapid production of gaseous combustion products, which exit the inflator through outlet openings 36.

This embodiment does not damage the matrix during initiation and provides for the combustible mixture to be released from the porous matrix through openings 27. The openings define a relatively constant matrix surface area for release of the combustible mixture. The rate of release can be adjusted by controlling the total surface area of the openings 27, by varying their number, size and/or shape. The length of the piston retainer 25 can be modified to provide room for more or less openings.

The proper functioning of the projectile is influenced by its design and the size of the initiator used. For instance, a more massive projectile would be more effective in piercing the hermetic barrier and moving the piston; however, such would require a larger initiator. The shape of the projectile can also influence its performance. For instance, a more conical or pointed shape could assure that the projectile enters the piston as intended.

The hermetic barrier 29 illustrated is integral with the wall 23 and can be manufactured as part of a double-impact forming process. Since it is not required to hold a pressurized material, it can be made very thin, such as 0.005 inches, when the housing and wall is fabricated from steel. Of course, the hermetic barrier could be fabricated otherwise, in manners well known to those of ordinary skill in the art, such as with a welded metal rupture disc or with a metal foil.

A modification of the preceding embodiment, wherein the projectile and piston concept of initiating flow from the storage container is replaced by a plunger and breakable hermetic barrier concept, is demonstrated in the embodiment of FIG. 3; wherein similar item numbers are used to designate similar elements. In this embodiment, a plunger 40 is provided directly in front of the pyrotechnic initiator 30 in an initiator housing 41. The initiator housing 41 includes stops 42, designed to retain the plunger 40 within the housing. The end of the plunger 40 adjoining the initiator is designed to act as a piston within the housing 41. The plunger further has a protruding portion 43 which is of sufficient length to extend across the combustion chamber 24, contact and dislocate a portion of a hermetic barrier 44 provided in the wall 23 between combustion chamber 24 and storage chamber 21, when the plunger 40 is at the fullest extent of its travel within the initiator housing 41. The hermetic barrier 44 needs to be of heavier construction than is required in the preceding embodiment inasmuch as it must contain the combustible mixture in the storage container at an elevated storage pressure. As in the preceding embodiment, the hermetic barrier 44 is shown as being formed integral with wall 23, however, it could be fabricated in other manners well known to those of ordinary skill in the art. Score lines 45 can be used to provide increased uniformity in the shape of the resulting openings. A crushable material 46 is provided in a cavity in the porous matrix directly adjacent the hermetic barrier 44. Such a configuration of crushable material 46 provides a receiver to absorb the dislocated hermetic barrier without damaging the porous matrix. To maintain the combustible mixture in a non-combustible condition, the crushable material 46 should preferably be formed such that any porosity therein is maintained at a pore size less than the quenching distance of the combustible mixture. It should be understood, however, that certain aspects of the present invention, such as the heat sink effect, will apply to the crushable material even if its overall pore size, or localized pore size in specific regions of the matrix, exceed the quenching distance or diameter.

Upon receipt of a signal from a crash sensor, the initiator 30 fires creating gaseous ignition products which propel the plunger portion 43 against the hermetic barrier 44, breaking it free of wall 23, and pushing it into the crushable material 46, thereby providing flow communication between storage chamber 21 and combustion chamber 24. The plunger is retained within housing 41 by stops 42. As the plunger approaches the retained position, some of the ignition products of initiator activation bypass the base of the piston through passages 47, or an expanded portion of the side wall of the housing 41, such as, either slots or a section of expanded inner diameter, whereby the ignition products are introduced to the combustion chamber. As the combustible mixture flows into and through the combustion chamber, it comes in contact with the ignition products from the initiator and is ignited, resulting in the rapid production of a large volume of product gases which exit the inflator through outlet orifices 36.

The crushable material 46 used in this embodiment could be selected from various materials including plastics, ceramics, rubbers, etc.

This embodiment, with its scored hermetic barrier, provides for a well defined uniform flow of the flammable mixture from the porous matrix into the combustion chamber. It further permits the flammable mixture to be released by the action of an external actuator, while avoiding the need to use a projectile in the ignition chain.

Figure 4:
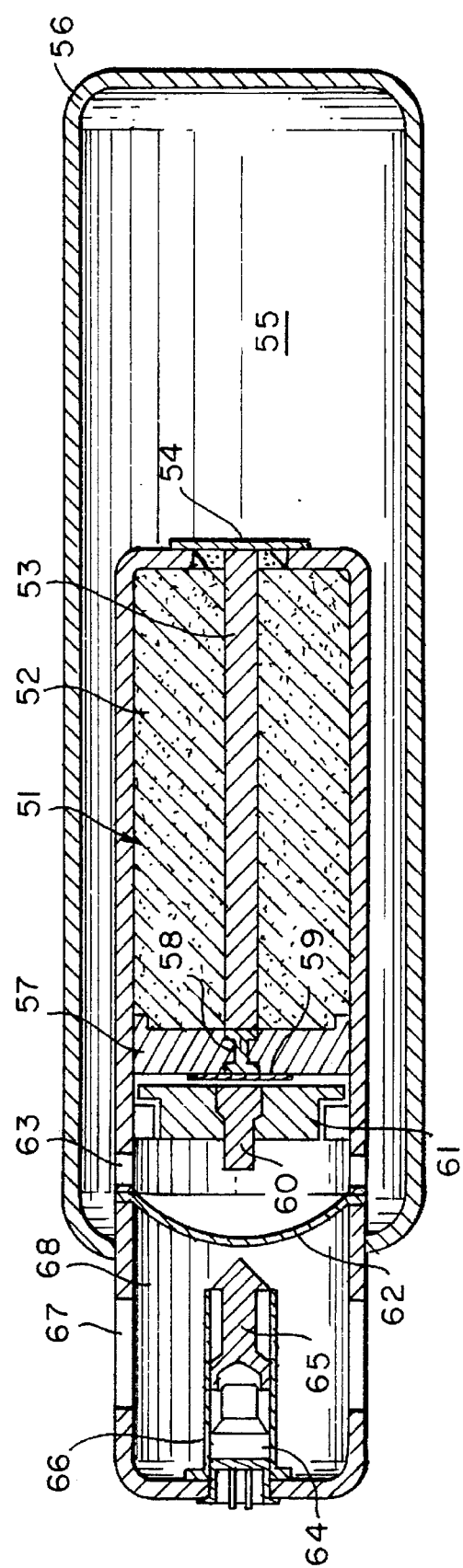
FIG. 4 illustrates a double chamber embodiment of the present invention.

A third specific embodiment, as illustrated in FIG. 4, provides a double chamber design wherein the stored combustible mixture is used to heat and augment a separately stored and relatively early released auxiliary gas. The combustible mixture is stored in a porous matrix 52 in storage chamber 51. A cylindrical consumable pyrotechnic charge 53 fits tightly within and fully fills a cavity which extends axially the length of the porous matrix 52. The storage chamber 51 is closed at one end by a rupture disc 54, which separates the storage chamber 51 from an auxiliary gas chamber 55, which is enclosed, in part, by inflator wall 56. At its other end, the storage chamber 51 is faced by a combined primer housing 57 and pressure sensitive primer 58. A thin hermetic barrier 59 is provided to prevent leakage of the combustible mixture around the primer. A striker 60, in striker housing 61, is aligned with the primer 58 directly opposite the hermetic barrier 59. Burst disc 62 assures sealing of the auxiliary gas chamber 55, which is in flow communication with burst disc 62 through ports 63. Initiator 64 is mounted behind projectile 65 in a projectile holder 66, which aligns the projectile with the striker 60. Outlets 67 are provided in diffuser 68 for the produced gas to exit the inflator.

This inflator activates when the initiator 64 receives an electrical signal from a crash sensor (not shown) causing it to ignite. Ignition of the initiator develops sufficient pressure behind the projectile to propel it through the burst disc 62 and into the striker 60. As soon as the burst disc is penetrated, auxiliary gas begins to flow, via ports 63, to outlets 67. Simultaneously, the striker 60 is forced into primer 58 causing it to ignite, in turn, igniting the consumable pyrotechnic charge 53. As charge 53 burns, it not only raises the pressure, it creates a void. The void thus created becomes a combustion chamber wherein the combustible mixture ignites and combusts as it flows from the porous matrix surrounding the void/combustion chamber. As the pressure rises, the strength of burst disc 54 is exceeded causing it to rupture. When the disc ruptures and the pressure in the chamber is released, the combustible mixture stored in the porous matrix flows into the void/combustion chamber where it is ignited. The resulting combustion products flow into and mix with the auxiliary gas in chamber 55, whereby the auxiliary gas is heated and expanded, resulting in a greatly augmented volume of product gas flowing through ports 63, and then outlets 67, to its intended function, i.e. inflation of an inflatable apparatus, such as an airbag cushion.

The consumable pyrotechnic charge can be prepared by molding or extruding solid shapes of pyrotechnic materials which, upon ignition, are substantially converted to vaporized reaction products. Typical pyrotechnic materials for use in such a charge include boron potassium nitrate, ammonium perchlorate and nitrocellulose. The primer 58 can be a percussion primer such as those typically used to provide ignition in small arms ammunition.

Release of the initial portion of the auxiliary gas before it has been heated provides a relatively low flow rate of gas into the cushion during the early stages of the bag inflation process, resulting in what is considered a softer bag. The use of such a softer bag is beneficial when vehicle occupants are out of position or when they are not wearing seat belts. Additionally, early release of the auxiliary gas lessens the maximum pressures encountered, thereby permitting the use of somewhat thinner inflation walls and components.

The auxiliary gas initially provided in auxiliary gas chamber 55 normally contains an inert or noble gas, such as argon or nitrogen. It can also contain an oxidizing gas, such as oxygen. The use of an auxiliary gas provides an augmented volume of product gas, while providing effective and complete tempering of the combustion products, thereby lowering the maximum temperatures to which the airbag materials and vehicle occupants are exposed.

Further control over the inflation characteristics of this embodiment is possible through control of the size, shape, type and location of the consumable pyrotechnic charge 53. Through the design of these features, control can be exercised over the rate at which a void space adjacent the porous matrix is generated, the rate of pressure increase due to burning pyrotechnic in chamber 51, the time required to release the burst disc 54, the subsequent rate of pressure increase and the rate of release of the ignited combustible mixture. The shape of the consumable pyrotechnic charge does not need to be cylindrical, but could be a number of different non-cylindrical shapes, such as various star shapes, or it could have a variable diameter along its axial length. The consumable pyrotechnic charge does not have to be located in the center of chamber 51, it can be placed elsewhere in the chamber as long as the striker and primer are properly designed to provide ignition. The pyrotechnic charge could be provided as two or more discrete integral bodies with separately controlled ignition. By varying the time of ignition of the separate pyrotechnic charges, control over the relative softness/hardness of the bag, dependent on factors such as the sensed severity of the collision, can be provided.

This system, with its unique actuation technique, could readily be modified to omit the stored auxiliary gas feature. Such a system could be made much smaller and lighter, and somewhat simpler. It would, however, lack some of the advantageous features of the depicted embodiment, such as the relatively cool temperature of the gas product.

Figure 5:
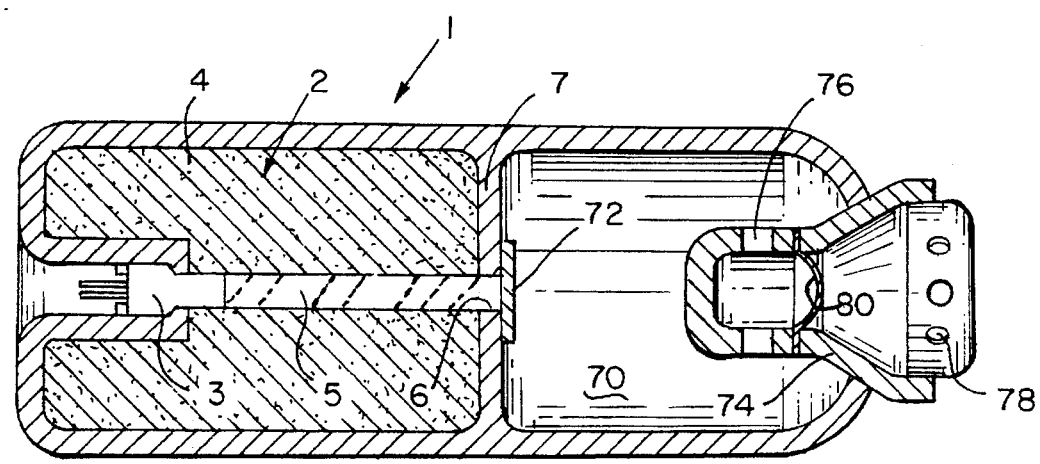
FIG. 5 illustrates a further double chamber embodiment of the present invention.

A further embodiment using a double chamber design wherein the flammable mixture is used to heat and augment an inert gas is illustrated in FIG. 5. Items in this embodiment are given the same item numbers as provided on corresponding items in FIG. 1. Inflator 1 includes a storage chamber 2 with an initiator 3 provided at one end thereof. As depicted, the storage chamber is filled by a porous matrix 4. A centrally located cavity extends through the porous matrix from the initiator 3 to a port 6 centrally located in wall 7, which separates storage chamber 2 from an inert gone containing chamber 70. The initiator 3 extends into one end of the cavity. The remaining volume of the cavity, as well as the volume within port 6, is occupied by a consumable pyrotechnic body 5. The porous matrix 4, as depicted, has maximum pore sizes less than the quenching distance of the combustible mixture stored therein. The porous matrix could, however, comprise two zones, the first directly adjacent the initiator 3 and the consumable pyrotechnic body 5, characterized by having pore sizes less than the quenching distance of the combustible mixture, and a second zone characterized by pore sizes larger than the quenching distance and surrounding the first zone. The first zone would assure that the gas mixture is quenched as it is discharged from the storage chamber while the second zone provides for an increased storage capacity than would be provided by a storage chamber containing only pore sizes less than the quenching distance. A prescored rupture disc 72 is hermetically sealed over port 6 to assure that the combustible mixture does not leak into inert gas chamber 70. A diffuser assembly 74 is sealingly attached to the wall of the inflator housing at the end of chamber 70 opposite rupture disc 72. The diffuser assembly 74 includes a first set of ports 76 providing fluid communication with the interior of the inert gas chamber 70 and a second set of ports 78 providing fluid communication with the exterior of the inflator. A further rupture disc 80 is located in the diffuser assembly between the first set of ports 76 and the second set of ports 78.

Upon activation by a signal received from a crash sensor (not shown), the initiator 3 fires causing ignition of the consumable pyrotechnic body 5. Burning of the consumable pyrotechnic body 5 causes a rapid pressure build up resulting in the rupture, along the pre-scored lines, of disc 72. The release of pressure coincident with the rupture of disc 72 permits the combustible mixture stored in the porous matrix 4 to flow into the void previously occupied by the consumable pyrotechnic body 5. As the combustible mixture flows into this void it is, both, (a) released from the constraint placed on it by being stored in an apparent volume having maximum dimensions less than its quenching distance, and (b) contacted by the heat and combustion products resulting from ignition of the initiator 3 and the pyrotechnic body 5. The combustible mixture ignites and the resulting combustion products mix with the inert gas stored in chamber 70, raising the pressure in that chamber to a level which causes rupture disc 80 to burst. The product gas then exits the inflator through diffuser assembly 74 and the second set of ports 78 and is routed to its intended use, i.e. to inflate an airbag cushion. The central cavity extending through the porous matrix becomes the combustion chamber once it is opened by burning of the consumable pyrotechnic body 5.

Figure 6:
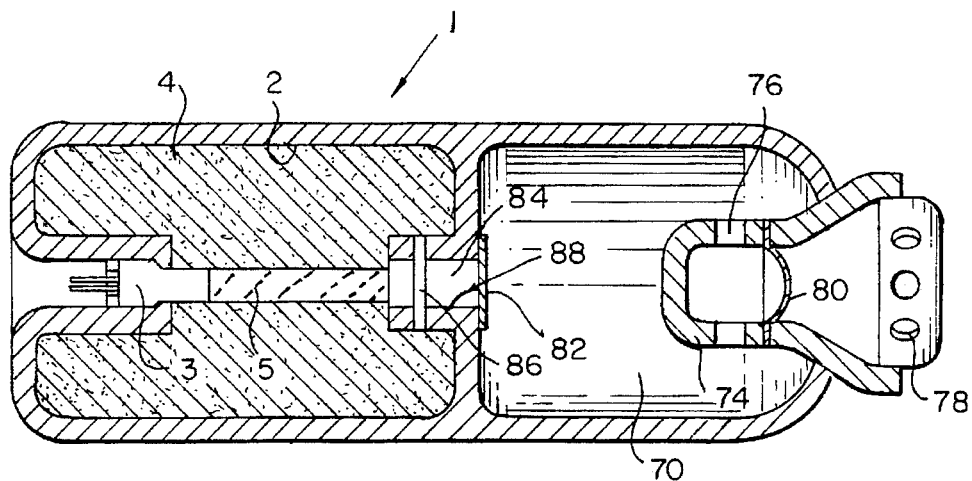
FIG. 6 illustrates an adaptation of the double chamber embodiment illustrated in FIG. 5.

An adaptation of the FIG. 5 embodiment is illustrated in FIG. 6. In this adaptation the rupture disc 72 of the FIG. 5 embodiment is replaced with a hermetic seal 82 which is breached by a projectile 84. In FIG. 6, items which correspond to items in the FIG. 5 embodiment, are identified by the same item numbers. When the FIG. 6 embodiment is activated by an electric signal, the initiator 3 fires igniting the consumable pyrotechnic body 5 and producing gaseous combustion products which develop significant pressure in the space previously occupied by the consumable pyrotechnic body 5. A retaining pin 86 which extends through the projectile housing 88 and the projectile 84, holds the projectile in position until the pressure developed by ignition of the pyrotechnic body 5 is sufficient to cause the retaining pin 86 to shear, allowing the projectile to be propelled into the inert gas chamber 70, opening the hermetic seal 82 in the process. Opening of the hermetic seal releases the pressure which had developed behind the projectile and allows the combustible mixture to pass from the porous matrix 4, where it is quenched, into the space previously occupied by the pyrotechnic body 5, where it is not quenched. The combustible mixture encounters and is ignited by the combustion products produced by the initiator 3 and the pyrotechnic body 5. The resultant products mix with the inert gases in chamber 70 raising the pressure in that chamber to the point that rupture disc 80 bursts, allowing the generated gases to exit the inflator through ports 76 and 78.

The use of a projectile in the embodiment of FIG. 6, enables the hermetic seal 82 to be opened at an internal pressure which is lower than that which would be required in the absence of such a projectile, which, permits the use of somewhat thinner and lighter structural materials in the inflator housing.

The preceding embodiments store combustible mixtures of fluid fuels and fluid oxidants in porous matrix structures having individual pore sizes which are smaller than the quenching distance of the combustible mixture. While the use of such small pore sized matrix structures provides a safe environment for the storage of combustible mixtures, the volume of the mixture that can be stored in such a matrix is relatively small in comparison to structures having larger pore sizes. The following figures illustrate embodiments of the invention wherein combustible mixtures are stored in structures which use porous matrixes having pore sizes larger than the quenching distance of the combustible mixture. These structures provide greater storage capacity while continuing to provide enhanced storage stability and safety due to the structure's capacity to function as a heat sink. During the filling of the combustible mixture, the matrix helps dissipate the heat produced as the mixture is compressed. Cooling of the compressed combustion gas assists in maintaining the temperature below its auto-ignition temperature. During the long term storage of the combustible mixture the heat sink capacity of the porous matrix will cool any localized high temperature excursion, or "hot spot", which might develop within the matrix, thereby again assisting in maintaining such "hot spot" beneath the mixture's auto-ignition temperature.

Figure 7:
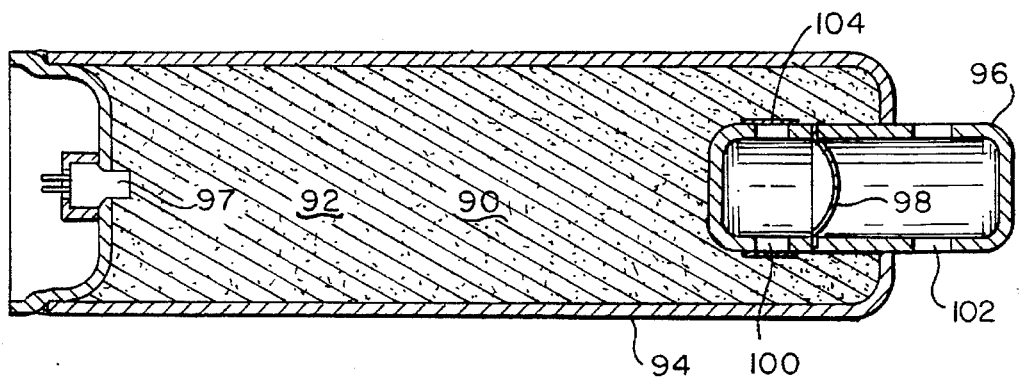
FIG. 7 illustrates a single chamber embodiment of the present invention which uses a porous structure having pore sizes larger than the quenching distance of the stored combustible mixture.

FIG. 7 illustrates a single chamber embodiment wherein the combustible mixture is stored in a porous matrix 90 having pore sizes larger than the quenching distance of the stored mixture. The porous matrix 90 fills the single chamber 92 defined by the housing 94 and diffuser 96. A rupturable element, such as a thin metal foil 104, seals the combustible mixture within the combustion chamber. Upon activation of the pyrotechnic initiator 97 by an external crash sensor (not shown), the combustible mixture is ignited by the heated ignition products produced by the initiator. Ignition of the combustible mixture rapidly propagates throughout the porous matrix raising its temperature to a point where it functions as a radiant burner providing efficient heat transfer to the combusting mixture, thereby encouraging its complete combustion. Since the combustible mixture is evenly dispersed throughout the matrix, and the temperatures developed during the combustion phase are moderated by the heat sink effect of the matrix, localized "hot spots" in the inflator are minimized. Combustion of the stored mixture develops an increased pressure in the chamber causing, first, the metal foil 104 to burst and, then, the rupture disc 98 in diffuser 96 to burst, allowing the product gases to exit the inflator through the diffuser's two series of vents 100 and 102.

The porous matrix 90 used in the storage/combustion chamber 92 can be formed from a ceramic or a metal, such as a reticulated ceramic or a sintered metal. The pores in the matrix are larger than the quenching distance of the stored combustible mixture. The larger the average pore size, the greater the storage capacity of the matrix. Virtually any pore size greater than the quenching distance can be used. Typically, pore sizes less than 12 mm in diameter are suitable.

The inflator illustrated in FIG. 7 could be modified by providing a layer of a porous matrix having pore sizes smaller than the quenching distance of the stored combustible mixture in a position the product gases must traverse as they pass from the large pore matrix to the inflator's discharge outlets 102. In this regard such layer could be provided on either the chamber or the diffuser side of vents 100. Such a layer of a smaller than quenching distance matrix would serve to prevent flame propagation extending through the diffuser and its outlets 102.

Figure 8:
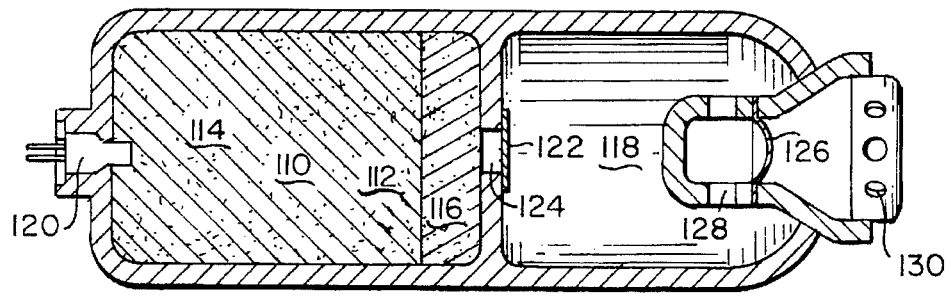
FIG. 8 illustrates a double chamber embodiment of the present invention wherein the porous matrix comprises two sections of different pore sizes.

FIG. 8 illustrates a double chamber inflator wherein the combustible mixture is stored in a porous matrix 110 provided in storage/combustion chamber 112. The porous matrix has two distinct sections, a section 114 wherein the matrix has relatively large pore sizes, and a smaller section 116 wherein the pore sizes of the matrix are smaller than the quenching distance of the stored mixture. Section 114 provides storage capacity, while section 116 provides for complete quenching of the combustion reaction before the combusted gas flows into the inert gas stored in auxiliary gas chamber 118. Upon activation of the pyrogenic initiator 120, the combustible mixture is ignited by the heat and particulates developed by initiator 120. The porous matrix in section 114 acts as a radiant burner assuring even and complete combustion. Upon opening of rupture disc 122, the combusted gases flow through porous matrix section 116, and outlet port 124, to mix with and heat the inert gas stored in auxiliary gas chamber 118. The combined gases result in a substantially increased volume of product gas which initially raises the pressure in chamber 118, causing rupture disc 126 to open. The product gas then exits the inflator through the diffuser by passing through ports 128 and 130.

Figure 9:
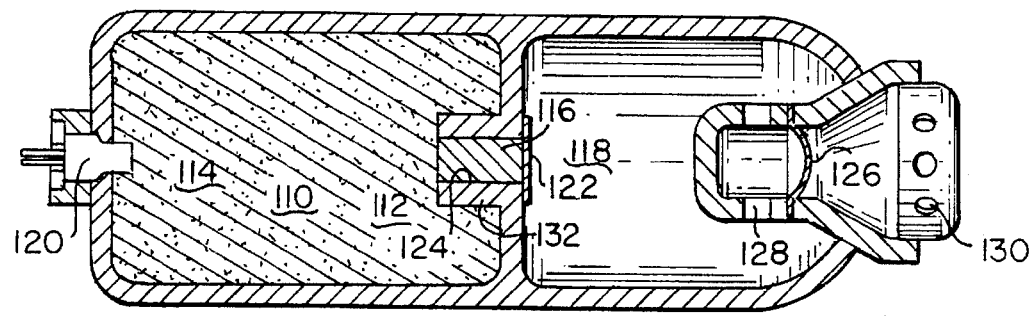
FIG. 9 illustrates a further double chamber embodiment of the present invention wherein the matrix comprises sections of different pore sizes.

FIG. 9 illustrates an inflator similar to that shown in FIG. 8, and uses similar item numbers to identify similar items. This embodiment mounts section 116 of porous matrix 110, having pore sizes smaller than the stored combustible mixture's quenching distance, in a housing 132 extending from and about the outlet port 124. The embodiment demonstrates that section 116 can be mounted in chamber 112 in any convenient manner, as long as the combusted gases are required to traverse section 116 as they pass from storage/combustion chamber 112 to the auxiliary gas chamber 118. This embodiment also demonstrates the use of the porous matrix to control the flow rate of combusted gases from the combustion chamber to the auxiliary gas chamber. Through selection of the pore size of the porous matrix adjacent outlet port 124, coupled with selection of the size of outlet port 124, the rate of heat addition to the inert gas, and, thus, the inflation characteristics of the airbag cushion, can be regulated. Control over the flow rate of the combustion gases from the combustion chamber also provides control over the residence time of the combustion gases in the combustion chamber whereby the combustion efficiency of the inflator can be optimized.

Figure 10:
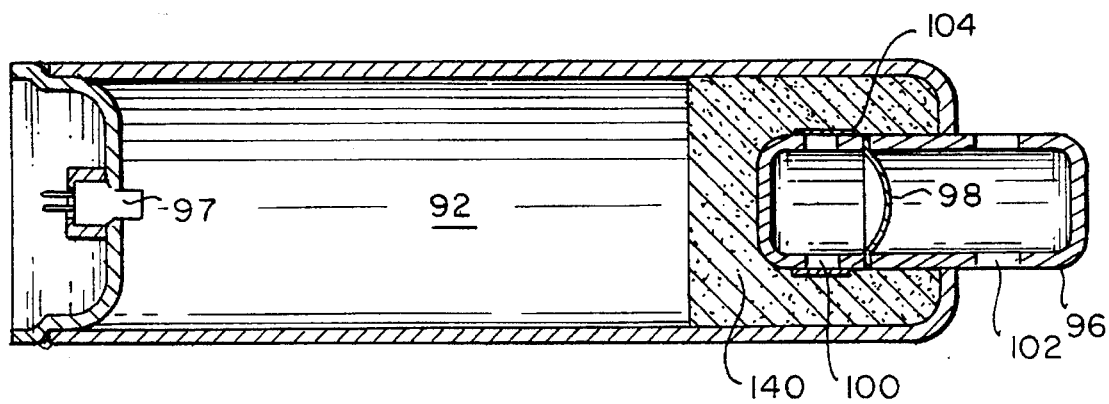
FIG. 10 illustrates an embodiment of the present invention wherein the porous matrix only occupies part of the storage/combustion chamber.

FIG. 10 illustrates an embodiment wherein the porous matrix is deployed primarily for its effect in quenching the combusted mixture and as a flow rate regulator. This embodiment is similar to that of FIG. 7, and uses the same item numbers where appropriate. In this embodiment the majority of storage/combustion chamber 92 is free of any structural component and the porous matrix 140 occupies only a portion of chamber 92 adjacent outlet ports 100 in diffuser 96. Upon activation of the initiator 97, the combustible mixture stored in chamber 92 is ignited creating combustion gases which initially raise the pressure in the chamber causing the rupturable element 104 and the rupture disc 98 to burst. The combusted gases then exit the inflator by passing through the porous matrix 140, ports 100, diffuser 96 and outlet ports 102. The pore size in the porous matrix 140 can be either larger or smaller than the quenching distance of the stored combustible mixture, and can be selected to provide the desired flow rate of the product gases to the airbag cushion. Adjustment of the flow length of the combusted gases in the porous matrix 140 will then provide control over the flame quenching effectiveness of the matrix. Alternatively, the total flow area of either the ports 100 or the outlet ports 102 can be reduced to a value less than the total exposed flow area of the porous matrix at its interface with the diffuser, whereby such ports 100 or outlet ports 102 function as throttling orifices controlling the flow rate of the product gases to the airbag cushion.

It should be understood that the preceding description has been provided to enable workers in the art to make and practice the disclosed invention. Workers in the art are capable of variations and modifications of the described inflators which would continue to embody the inventive concepts described herein. For instance, the depicted embodiments have used pyrotechnic initiators. Other initiators, such as spark discharge initiators, heated wire initiators, through bulkhead initiators, etc. are well known and often used in the art. It would be well within the skill in the art to modify the inflators illustrated herein by providing one of the other well known initiators in place of the depicted pyrotechnic initiators. Such variations and modifications are intended to be covered by this patent to the extent they fall within the scope of the following claims.

We claim:

1. In an inflator for producing gas to inflate an inflatable apparatus, comprising:

an initiator;

a storage chamber containing a combustible mixture of a fluid fuel and an oxidant; and at least one discharge outlet from the interior to the exterior of the inflator; wherein:

activation of said initiator produces heated initiator products and results in the ignition of said combustible mixture producing a volume of combusted gas which passes through said discharge outlet to be made available to said inflatable apparatus;

the improvement comprising a solid porous matrix adapted to contain a portion of said combustible mixture is located in said storage chamber.

2. The inflator of claim 1, wherein:

a sufficient volume of said solid porous matrix is provided in said storage chamber that said matrix is capable of suppressing flame propagation in said stored combustible mixture.

3. The inflator of claim 1, wherein:

said solid porous matrix fully occupies said storage chamber.

4. The inflator of claim 3, wherein:

said solid porous matrix comprises two sections, a first section wherein the pore size of the matrix is larger than the quenching distance of the combustible mixture, and a second section wherein the pore size of the matrix is smaller than the quenching distance of the combustible mixture.

5. The inflator of claim 4, wherein:

said storage chamber has at least one gas outlet, which gas outlet is in fluid communication with said discharge outlet when said inflator is activated, and said second section of said solid porous matrix is located adjacent said at least one gas outlet.

6. The inflator of claim 1, further comprising:

an auxiliary gas chamber containing an inert gas located between said storage chamber and said discharge outlet, whereby:

said combusted gas flows through said auxiliary gas chamber and mixes with said inert gas as it flows to said discharge outlet.

7. The inflator of claim 1, wherein:

the size of the pores in said porous matrix are larger than the quenching distance of said combustible mixture.

8. The inflator of claim 1, wherein:

the size of the pores in said porous matrix are smaller than the quenching distance of said combustible mixture.

9. The inflator of claim 1, wherein:

said solid porous matrix is formed from a reticulated ceramic.

10. The inflator of claim 1, wherein:

said storage chamber has at least one gas outlet, which gas outlet is in fluid communication with said discharge outlet when said inflator is activated, and said solid porous matrix is located directly adjacent said gas outlet.

11. The inflator of claim 1, further comprising:

a combustion chamber; and an opening means capable of providing flow communication between said storage chamber and said combustion chamber when said initiator is activated;

wherein activation of said initiator causes said opening means to provide flow communication between said storage chamber and said combustion chamber, and said heated initiator products ignite said combustible mixture in said combustion chamber.

12. The inflator of claim 11, wherein the pore size of said porous matrix is smaller than the quenching distance of said combustible mixture.

13. The inflator of claim 12, wherein said porous matrix occupies all of the space within said storage chamber.

14. The inflator of claim 11, wherein said storage chamber has an outlet in flow communication with said combustion chamber by way of said opening means, and said porous matrix is located adjacent said outlet.

15. The inflator of claim 11, wherein the pore sizes within said porous matrix are larger than the quenching distance of said combustible mixture.

16. The inflator of claim 11, wherein said porous matrix comprises a structure having at least two different zones, a first zone wherein the pore size of the porous matrix is smaller than the quenching distance of the combustible mixture, and a second zone wherein the pore size of the porous matrix is larger than the quenching distance of the combustible mixture.

17. The inflator of claim 16, wherein said storage chamber has an outlet in flow communication with said combustion chamber through said opening means, and said first zone of said porous matrix is located adjacent said outlet.

18. The inflator of claim 11, wherein said fluid fuel is selected from the group consisting of hydrogen, methane, ethane, propane, butane and mixtures thereof.

19. The inflator of claim 11, wherein said fluid fuel is selected from the group consisting of liquid alcohols, hydrocarbons, hydrocarbon derivatives and mixtures thereof.

20. The inflator of claim 11, wherein said combustible mixture contains a stoichiometric excess of the oxidant.

21. The inflator of claim 11, wherein said combustion chamber contains a fluid oxidant.

22. The inflator of claim 21, wherein said fluid oxidant comprises a mixture of oxidizing and inert gases.

23. The inflator of claim 21, wherein the combination of said combustible mixture and said fluid oxidant provides a stoichiometric excess of oxidant.

24. The inflator of claim 11, further comprising:

a structural member having an opening therein separating said storage chamber and said combustion chamber, and wherein said opening means comprises a plug located in said opening such that activation of said initiator causes said plug to be displaced thereby establishing fluid communication between said storage chamber and said combustion chamber through said opening.

25. The inflator of claim 24, wherein a removable sealing means is provided over said opening to establish a hermetic seal.

26. The inflator of claim 25, wherein said sealing means comprises a thin metal diaphragm extending over said opening and one end of said plug.

27. The inflator of claim 24, wherein:

a rupturable seal is located between said combustion chamber and said outlet, and said plug is located in said opening such that its displacement propels it at said rupturable seal.

28. The inflator of claim 27, wherein:

the end of said plug facing said rupturable seal is tapered.

29. The inflator of claim 11, wherein:

said combustion chamber is located in a cavity extending through said porous matrix, and said opening means comprises a solid pyrotechnic body located in said combustion chamber.

30. The inflator of claim 29, wherein:

said solid pyrotechnic body is made of materials which are substantially consumed during ignition.

31. The inflator of claim 30, wherein:

the solid consumable pyrotechnic body essentially fully occupies said combustion chamber.

32. The inflator of claim 31, wherein:

said solid consumable pyrotechnic body extends adjacent said storage chamber whereby its consumption provides for flow communication between said storage chamber and said combustion chamber.

33. The inflator of claim 29, further comprising:

auxiliary gas chamber located adjacent said storage chamber;

a structural member containing an opening separating said storage chamber from said auxiliary gas chamber; and a rupturable seal sealing said opening in said structural member, whereby
 ignition of said solid pyrotechnic body causes said rupturable seal to break, thereby creating flow communication between said combustion chamber and said auxiliary gas chamber.

34. The inflator of claim 33, wherein:

a projectile housing extends from said opening provided in said structural member to said solid pyrotechnic body, a projectile is provided in said projectile housing adjacent said solid pyrotechnic body, whereby
 ignition of said solid pyrotechnic body causes said projectile to be propelled through said rupturable seal thereby establishing flow communication between said combustion chamber and said auxiliary gas chamber.

35. The inflator of claim 11, further comprising:

an auxiliary gas chamber containing an auxiliary gas;

said auxiliary gas chamber being located such that the combusted gas produced in the combustion chamber passes through the auxiliary gas chamber on its way to said at least one outlet.

36. The inflator of claim 35, wherein:

said auxiliary gas comprises an inert gas.

37. The inflator of claim 35, wherein:

said inert gas comprises argon.

38. The inflator of claim 35, wherein:

said auxiliary gas comprises an oxidant.

39. The inflator of claim 35, wherein:

a rupturable seal is provided between said combustion chamber and said auxiliary gas chamber.

40. The inflator of claim 35, wherein:

a rupturable seal is provided between said auxiliary gas chamber and said at least one outlet.

41. The inflator of claim 11, further comprising:

an initiator housing extending about said initiator, a structural member separating said storage chamber from said combustion chamber, and wherein:

said opening means comprises:
 a plunger mounted in said initiator housing with one end thereof adjacent said initiator, and the other end of said plunger including a protruding portion, and
 a rupturable portion in said structural member;
whereby activation of said initiator causes said plunger to move in said initiator housing to a position where said protruding portion strikes and ruptures said rupturable portion thereby establishing flow communication between said storage chamber and said combustion chamber.

42. The inflator of claim 41, wherein:

said initiator housing includes an element which retains said plunger in said housing after it passes through the position at which said protruding portion strikes said rupturable portion.

43. The inflator of claim 41, wherein:

said initiator housing includes means permitting a portion of said initiator products to pass from the interior to the exterior of said initiator housing.

44. The inflator of claim 42, wherein:

said means permitting a portion of the initiator products to pass comprise holes in the side of the initiator housing extending from the interior of the housing to the exterior of the initiator housing.

45. The inflator of claim 11, further including:

a first wall separating said storage chamber from said combustion chamber, a piston retainer comprising a side wall extending from said first wall into said storage chamber, said piston retainer having openings in its side wall, said opening means including a piston mounted in said piston retainer;
whereby activation of said initiator results in said piston being displaced in said retainer, said displacement of the piston providing flow communication between said storage chamber and said combustion chamber via said openings in said side wall.

46. The inflator of claim 45, wherein:

said first wall includes a rupturable portion located adjacent said piston retainer.

47. The inflator of claim 46, wherein said initiator is located in a mounting structure which extends from said initiator towards said piston, and said opening means includes a projectile located in said mounting structure, whereby activation of said initiator propels said projectile toward said piston causing said piston to be displaced in said piston retainer.

48. The inflator of claim 1, further comprising:

a combustion chamber located in a cavity extending through said porous matrix; and an opening means comprising:
 a solid pyrotechnic body located in said combustion chamber,
 a pressure sensitive primer located adjacent said solid pyrotechnic body,
 a striker which is responsive to activation of said initiator to exert pressure on said pressure sensitive primer; whereby:
activation of said initiator causes said striker to cause ignition of said primer and said solid pyrotechnic body, resulting in the consumption of said solid pyrotechnic body allowing said combustible mixture to flow into said combustion chamber.

49. The inflator of claim 48, wherein said opening means further comprises:

a projectile located adjacent said initiator and directed toward said striker; whereby
 activation of said initiator causes said projectile to be propelled toward and collide with said striker, causing said striker to exert said pressure on said primer.

50. The inflator of claim 1, further comprising:

an auxiliary gas chamber containing a pressurized auxiliary gas;

a rupturable seal located between said auxiliary gas chamber and said at least one discharge outlet;

a projectile located adjacent said initiator and directed toward said rupturable seal; wherein activation of said initiator causes said projectile to be propelled toward and to rupture said rupturable seal permitting said auxiliary gas to flow from said auxiliary gas chamber to said at least one discharge outlet.

51. In a process of producing gas, comprising:

providing a combustible mixture of a fluid fuel and an oxidant, storing said combustible mixture in a storage container, initiating gas production by activating an initiator which produces ignition products and causes said combustible mixture to ignite and produce a combusted mixture, the improvement comprising:

providing a solid porous matrix in said storage container said solid porous matrix being adapted to contain a portion of the combustible mixture stored in said storage container.

52. The process of claim 51, wherein:

initiating gas production further comprises causing said combustible mixture to pass from said porous matrix into a combustion zone, and igniting said combustible mixture by contacting it with said ignition products in said combustion zone.

53. The process of claim 52, wherein:

initiating gas production further comprises:

transmitting an electrical signal to said initiator causing it to activate and produce said ignition products, using said ignition products to propel a projectile, directing said projectile to contact and break a seal separating said porous matrix from said combustion zone.

54. The process of claim 52, wherein:

initiating gas production further includes:

transmitting an electrical signal to said initiator causing it to activate and produce said ignition products, providing a pyrotechnic body adjacent said initiator, providing a structure between said porous matrix and said combustion zone, said structure including a rupturable seal, igniting said pyrotechnic body by contacting it with said ignition products to produce sufficient pyrotechnic ignition products to break said rupturable seal whereby flow communication between said storage container and said combustion zone is established.

55. The process of claim 51, wherein the maximum pore diameter of said porous matrix is smaller than the quenching distance of said combustible mixture.

56. The process of claim 51, further comprising:

contacting and mixing said combusted mixture with an auxiliary gas in an auxiliary gas chamber to produce said product gases.

57. The process of claim 56, wherein:

initiating gas production further includes:

transmitting an electrical signal to said initiator causing it to ignite producing said ignition products, igniting a consumable pyrotechnic body by contacting it with said ignition products thereby producing pyrotechnic ignition reaction products and breaking a rupturable seal separating said porous matrix from said auxiliary gas chamber.

58. The process of claim 51, further comprising:

locating a combustion zone directly adjacent said porous matrix, providing a consumable pyrotechnic body in said combustion zone, and wherein:

initiating gas production further includes:

igniting said consumable pyrotechnic body, permitting said combustible mixture to flow from said porous matrix into said combustion zone as said consumable pyrotechnic body is consumed, and igniting said combustible mixture as it flows into and through said combustion zone.

59. The process of claim 51, further comprising:

inflating the cushion of a vehicle airbag system with the recovered product gases.

60. The process of claim 51, wherein:

said ignition products ignite said combustible mixture in said storage chamber, and said solid porous matrix comprises porous material having a pore size greater than the quenching distance of said combustible mixture.

61. The process of claim 51, wherein a volume of said solid porous matrix which is capable of suppressing flame propagation in said combustible mixture is provided in said storage container.

* * * * *

UNITED STATES PATENT AND TRADEMARK OFFICE
CERTIFICATE OF CORRECTION

PATENT NO. : 5,649,720

DATED : July 22, 1997

INVENTOR(S) : Rink, et al

It is certified that error appears in the above-indentified patent and that said Letters Patent is hereby corrected as shown below:

At Col. 11, line 29, "gone" should be --gas--.
At Col. 17, line 15 "auxiliary" should be --an auxiliary--.
At Col. 17, line 45, "35" should be --36--.
At Col. 18, line 13, "42" should be --43--.

Signed and Sealed this

Seventeenth Day of March, 1998

Attest:

BRUCE LEHMAN

Attesting Officer

Commissioner of Patents and Trademarks